United States Patent [19]

Bittner et al.

[11] Patent Number: 5,290,033
[45] Date of Patent: Mar. 1, 1994

[54] GAMING MACHINE AND COUPONS

[76] Inventors: Harold G. Bittner, 2812 Bancroft, Missoula, Mont. 59801; Patrick J. Greene, 88 Kendall Rd., Boxboro, Mass. 01719; Verne S. Kayser, 2140 Nashoba Rd., W. Acton, Mass. 01720

[21] Appl. No.: 985,171

[22] Filed: Dec. 2, 1992

[51] Int. Cl.5 .......................... G07F 7/08; A63F 9/00
[52] U.S. Cl. ............................... 273/138 A; 194/206; 194/212; 194/210; 194/213; 235/381
[58] Field of Search ............... 273/138 A, 138 R, 139; 194/210, 206, 212, 213, 350; 235/381

[56] References Cited

U.S. PATENT DOCUMENTS

| | | | |
|---|---|---|---|
| 3,958,103 | 5/1976 | Oka et al. | 194/210 |
| 4,124,109 | 11/1978 | Bissell et al. | 194/210 |
| 4,373,726 | 2/1983 | Churchill et al. | 273/138 A |
| 4,809,837 | 3/1989 | Hayashi | 194/210 |

OTHER PUBLICATIONS

"Triad Bus Coupon Redemption and Accounting System Laser Coin," Operating Instructions, Triad Design Group, Inc., Jan. 15, 1990.
"Model IVO-Operation and Technical Manual," Coin Bill Validator, Inc., Date Unknown.

*Primary Examiner*—Benjamin H. Layno
*Attorney, Agent, or Firm*—Wells, St. John, Roberts, Gregory & Matkin

[57] ABSTRACT

A gaming machine and game coupons are disclosed for allowing an operator to redeem winning game coupons by inserting them directly into the gaming machine rather than by taking them to a cashier. The game coupons are coded with a machine-readable prize code which represents a number of prize game credits. The gaming machine includes a bill validator for accepting currency and winning game coupons from an operator. It also includes a code reader for reading the coupon prize codes as the coupons are inserted into the bill validator. The gaming machine issues game credits to the player depending on the prize codes of the submitted game coupons. The gaming machine also incorporates a fraud prevention scheme to guard against fraudulently copied or duplicated winning coupons. Each winning coupon is coded with a unique coupon identification code. The code reader reads and records the coupon identification code of each winning coupon as it is submitted. Subsequently, as further game coupons are submitted their coupon identification codes are checked against the codes already recorded. Detected duplicates are rejected.

24 Claims, 6 Drawing Sheets

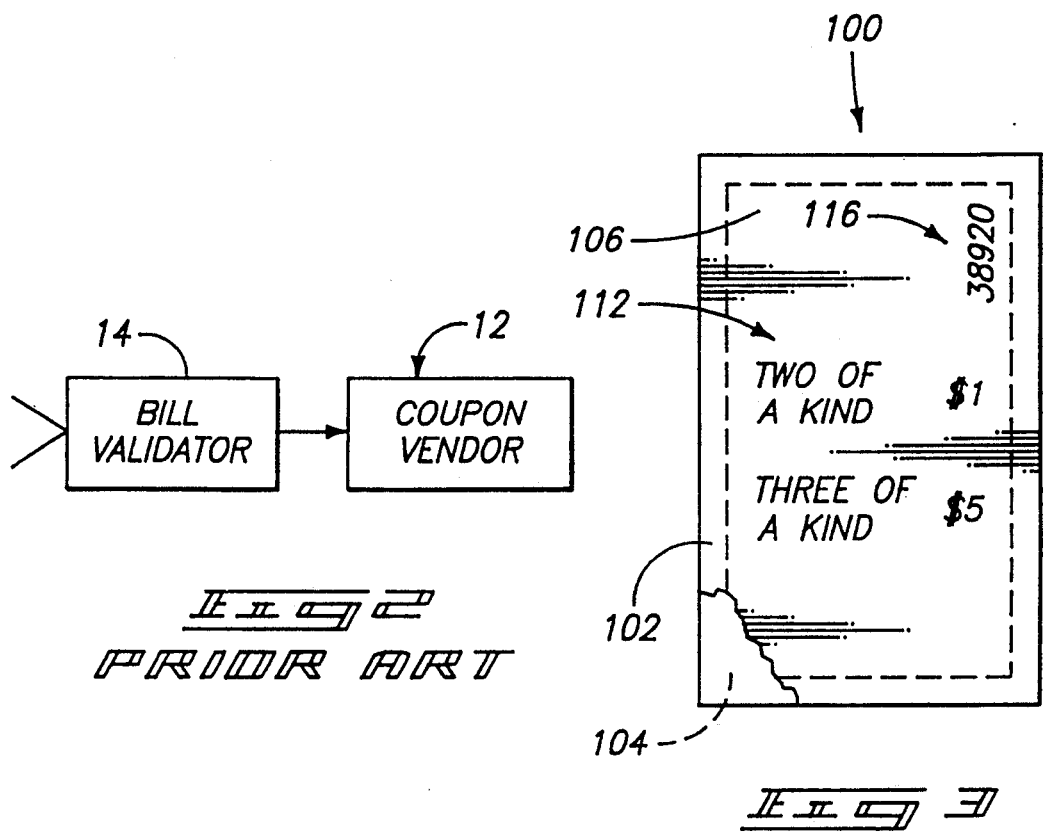
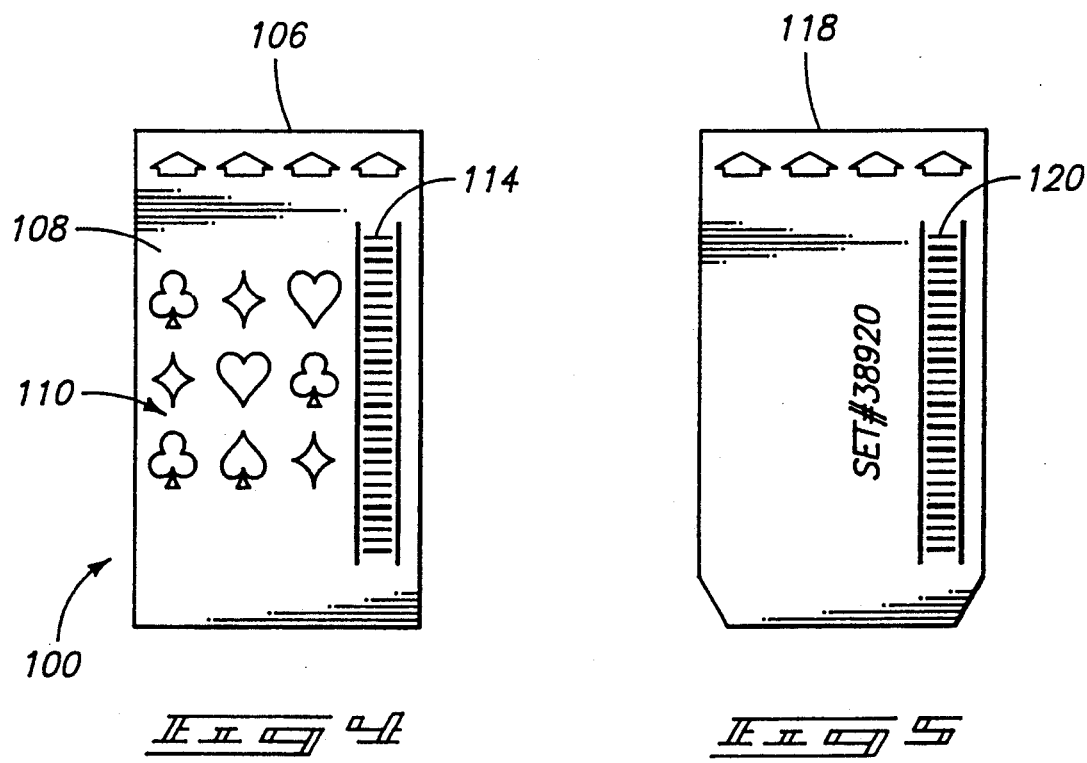

GAMING MACHINE AND COUPONS

TECHNICAL FIELD

This invention relates to methods and systems for operating automated gaming machines such as pull-tab machines.

BACKGROUND OF THE INVENTION

Automated gaming devices or machines are manufactured in a great variety of types. A pull-tab machine is one such type of gaming machine. A player purchases game coupons from a pull-tab machine by feeding it cash or game tokens. Each game coupon has a hidden display area which can be revealed to indicate whether the game coupon is a winning coupon. Winning coupons can be redeemed for cash winnings, game tokens, or other prizes.

The game coupons themselves are commonly packaged in game coupon sets. Each game coupon set comprises a known total of individual game coupons and a known number of winning game coupons within the total. Individual game coupons usually have two piles: a facing ply and a backing-ply. Serrated windows or tabs are formed in the facing ply of the coupon. The backing ply is imprinted with game symbols or other representations beneath the tabs. To determine whether an individual game coupon is a winning coupon, a player peels back the tab to reveal the game symbols. Winning game coupons are redeemed for cash or game coupons with a cashier.

FIG. 1 shows a typical prior art pull-tab machine, generally designated by the reference numeral 10. Pull-tab machine 10 comprises generally a coupon vendor 12 and a bill or currency validator 14, also shown schematically in FIG. 2.

Coupon vendor 12 comprises one or more coupon magazines 16, each receiving a vertical stack of pull-tab game coupons 18. Coupon vendor 12 further comprises a coupon dispensing slot 20 through which pull-tab coupons are dispensed. Bill validator 14 is mounted along the side of coupon vendor 12. Bill validator 14 is a standard and widely available device used in many types of vending machines for accepting and verifying denominated currency. Bill validator 14 issues a sequence of electronic pulses to coupon vendor 12 in response to receiving valid currency. Each pulse represents a specified cash amount or a specified number of game credits. Coupon vendor 12 accepts the electronic pulses from bill validator 14, crediting the player with game credits in response. The number of issued game credits is sometimes indicated by a numeric display 19. Thereafter, coupon vendor 12 dispenses individual game coupons at the player's command to the extent of the accumulated game credits.

Coupon vendor 12 includes a selection dispensing button 24 corresponding to each coupon magazine 16. Indicator lamps 26 are mounted above selection dispensing buttons 24 to indicate when the corresponding coupon magazines are available for selection. A player spends an issued game credit by depressing one of selection dispensing buttons 24, causing a game coupon to be dispensed from the corresponding coupon magazine 16. For each button depressed, the machine dispenses an individual game coupon and simultaneously subtracts a game credit from the player's total. Some machines dispense multiple game coupons if the corresponding selection dispensing button is held down, providing the player has enough game credits.

Each of coupon magazines 16 is typically loaded with a single set of game coupons. Since the coupon magazines and the game coupons stacked therein are usually visible, both players and the machine operator may monitor winnings to predict the odds as the number of coupons in each magazine is depleted. For instance, as the number of undispensed coupons decreases without a winner, the odds of winning become significantly greater. The number of winning coupons in each game coupon set, and their winning values, are usually known to players.

After receiving winning coupons, players must physically take them to the proprietor or cashier of the gaming establishment for redemption. An important disadvantage of a gaming machine such as that described above is that significant time and effort are consumed, by both the player and the proprietor of a gaming establishment, in redeeming winning game coupons for cash. Furthermore, during the time it takes to cash in a winning coupon a player sometimes loses interest in the game. The invention described below remedies this problem, allowing a player to continue a game without interruption while utilizing winning game coupons to purchase additional game credits.

BRIEF DESCRIPTION OF THE DRAWINGS

Preferred embodiments of the invention are described below with reference to the accompanying drawings:

FIG. 2 is a simplified block diagram of a pull-tab machine in accordance with the prior art;

FIG. 3 is a front view of a pull-tab game coupon in accordance with a preferred embodiment of this invention;

FIG. 4 is a playing portion of a pull-tab game coupon, the playing portion having been detached from the pull-tab game coupon of FIG. 3;

FIG. 5 is a front view of a game set-up coupon in accordance with a preferred embodiment of this invention;

DETAILED DESCRIPTION OF THE PREFERRED EMBODIMENT

Figure 1:
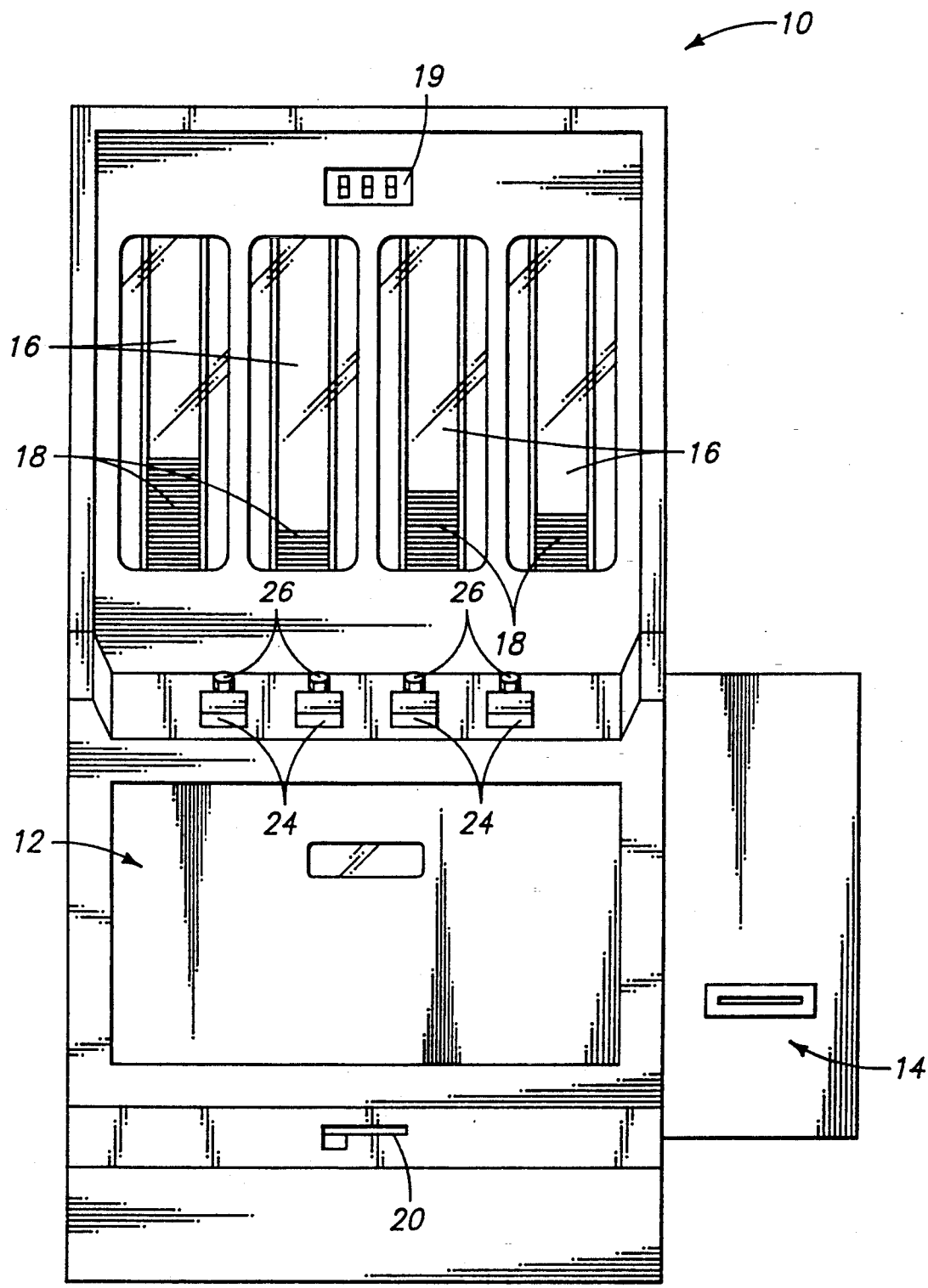
FIG. 1 is a front view of a pull-tab gaming machine in accordance with the prior art.

This disclosure of the invention is submitted in furtherance of the constitutional purposes of the U.S. Patent Laws "to promote the progress of science and useful arts." U.S. Constitution, Article 1, Section 8.

FIGS. 3 and 4 show an individual pull-tab game coupon 100 in accordance with a preferred embodiment of the invention. Coupon 100 has two plies or layers: a facing layer 102 and a backing layer 104. Facing layer 102 is serrated, as shown by the dashed lines in the front view of FIG. 3, to define a removable playing portion 106.

To determine whether a game coupon is a winning coupon, playing portion 106 is peeled partially or completely away from backing layer 104. Back side 108 of playing portion 106, as shown in FIG. 4, is imprinted with game symbols 110, providing a player-readable prize code indicating the winnings or prize credits represented by the game coupon. The player-readable prize code consists of rows of generally known symbols such as used in slot machines, for example. A legend or prize code key 112 is preferably printed on the front side of playing portion 106 to indicate the amount of winnings or game credits associated with specific combinations of symbols.

The specific physical configuration of game coupon 100 enables it to be easily handled and transported by automated devices. Prior art pull-tabs when opened include a number of connected and awkwardly-extending flaps or tabs. In contrast, the operable or playing portion 106 of an opened game coupon 100 consists of a single, flat sheet of paper or thin cardboard. As described below, such a sheet can be received and handled by a bill or currency validator, while inserting an opened prior art pull-tab coupon into a bill validator would be difficult because of the extending flaps. Game coupon 100 thus provides a much improved pull-tab coupon, being easily opened and viewed by a player, and having the additional advantage of being easily handled by a commonly available bill validator.

Furthermore, in addition to game symbols 110 each winning game coupon 100 includes a machine-readable prize code to indicate the number of prize game credits for which the coupon is redeemable. Game coupon 100 also includes a unique machine-readable coupon identification code and a machine-readable game set code. Each game coupon of a game coupon set has its own, unique coupon identification code. However, all game coupons in a single game coupon set have identical game set numbers. These codes are used to authenticate game coupons and to prevent duplication of winning coupons.

More specifically, back side 108 of playing portion 106 is encoded with a digital, machine-readable barcode 114. Barcode 114 allows a pull-tab machine, when equipped with a bar-code reader as described below, to determine both the validity of the game coupon and the number of prize game credits with which the player should be credited. The barcode utilizes a standard format such as "interleaved two of five." As a further protection against fraud, copying can be largely prevented by printing the barcode on a background of grey OCR ink.

Barcode 114, in the preferred embodiment, represents ten decimal digits which can be decoded by a standard barcode reader. The ten decimal digits are allocated between the game set code, the coupon identification code, and the prize code. Arrows are optionally printed on playing portion 106 to indicate the direction in which it should be inserted into the pull-tab machine, to insure proper reading of barcode 114.

Five of the ten barcoded digits are allocated to a game set code which ranges from 0 to 99,999. The game set code is common to all game coupons in a single game coupon set, i.e., each game coupon of the set bears an identical game set code.

Three of the ten digits are allocated to a unique coupon identification code. Each winning coupon in a single game set bears a unique coupon identification code ranging from 0 to 999. Coupon identification codes 0 through 997 represent winning game coupons. Coupon identification code 998 represents a winning coupon which, because of a high winning amount, is redeemable only by a cashier. Coupon identification code 999 signifies a set-up coupon as described below.

The two remaining digits are allocated to a prize code, indicating the winning amount or the number of prize credits associated with the winning game coupon.

Each set of game coupons includes a plurality of game coupons 100. Each coupon within the set is identified by a common game set code which is visible on the face of the coupon (generally designated by the reference numeral 116 in FIG. 3). A known number of game coupons 100 within each set are winning coupons, and are therefore redeemable for cash or a number of prize game credits.

FIG. 5 shows a game set-up coupon 118. A single game set-up coupon 118 is provided with each game coupon set. Each game set-up coupon 118 bears a game set-up code, imprinted on game set-up coupon 118 in the form of a barcode 120. The game set-up code includes a coupon identification code equal to 999 to identify it as a set-up coupon. The game set-up code also includes a game set code, corresponding to the game set code 116 imprinted on the face of each coupon in the set, as well as any other information or codes required to configure the pull-tab machine for use with the set of game coupons.

In operation, a game coupon set is initially loaded into the magazines of a pull-tab machine. The game set-up coupon is subsequently read by the pull-tab machine. The game set-up coupon is identified as a set-up coupon by its coupon identification number of 999. The pull-tab machine records the game set code for later comparison with the game set codes from submitted winning game coupons.

Figure 6:
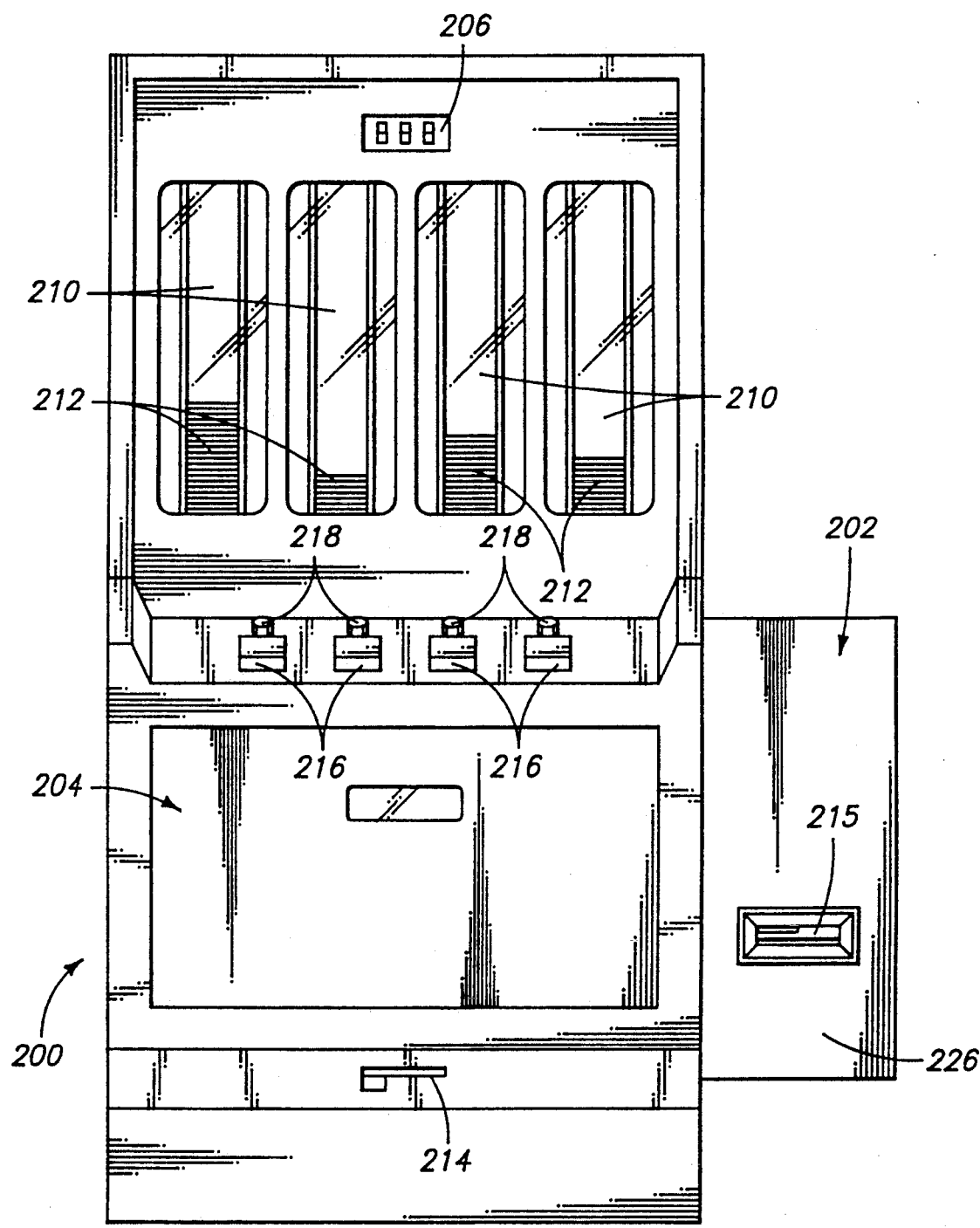
FIG. 6 is a front view of a pull-tab gaming machine in accordance with a preferred embodiment of the invention.

FIG. 6 shows a pull-tab gaming machine 200 in accordance with a preferred embodiment of the invention. Pull-tab gaming machine 200 comprises a coupon acceptor 202, a coupon machine or vendor 204, and a visual numeric display 206. It is adapted to accept and authenticate game coupons such as those described above.

Coupon vendor 204 is a conventional pull-tab dispenser which is triggerable to dispense individual game coupons to a player. Coupon vendor 204 thus comprises one or more coupon magazines 210, each containing a vertical stack of pull-tab game coupons 212, such as those described above. Coupon vendor 204 further comprises a coupon dispensing slot 214 through which pull-tab coupons 212 are dispensed.

Coupon acceptor 202 is mounted alongside coupon vendor 204. It could alternatively be mounted or incorporated within coupon vendor 204. Coupon acceptor 202 accepts submitted currency and game coupons through a receiving bezel 215. Coupon acceptor 202 issues a sequence of electronic pulses to coupon vendor 204 in response to receiving winning game coupons or valid currency. Eash pulse represents a specified cash amount or a specified number of game credits. Coupon vendor 204 accepts the electronic pulses from coupon acceptor 202, crediting the player with game credits in response to the electronic pulses. The number of issued game credits is indicated by numeric display 206. Thereafter, coupon vendor 204 dispenses individual game coupons at the player's command to the extent of the accumulated game credits.

Coupon vendor 204 includes a selection dispensing button 216 corresponding to each multiple coupon magazine 210. Indicator lamps 218 are mounted above the selection buttons 216 to indicate when the corresponding coupon magazines are available for selection. A player spends an issued game credit by depressing one of the selection buttons, causing a game coupon to be dispensed from the corresponding coupon magazine 210. For each button depressed, the machine dispenses an individual game coupon and simultaneously subtracts a game credit from the player's total. Some machines dispense multiple game coupons if the corresponding selection dispensing button is held down.

Figure 7:
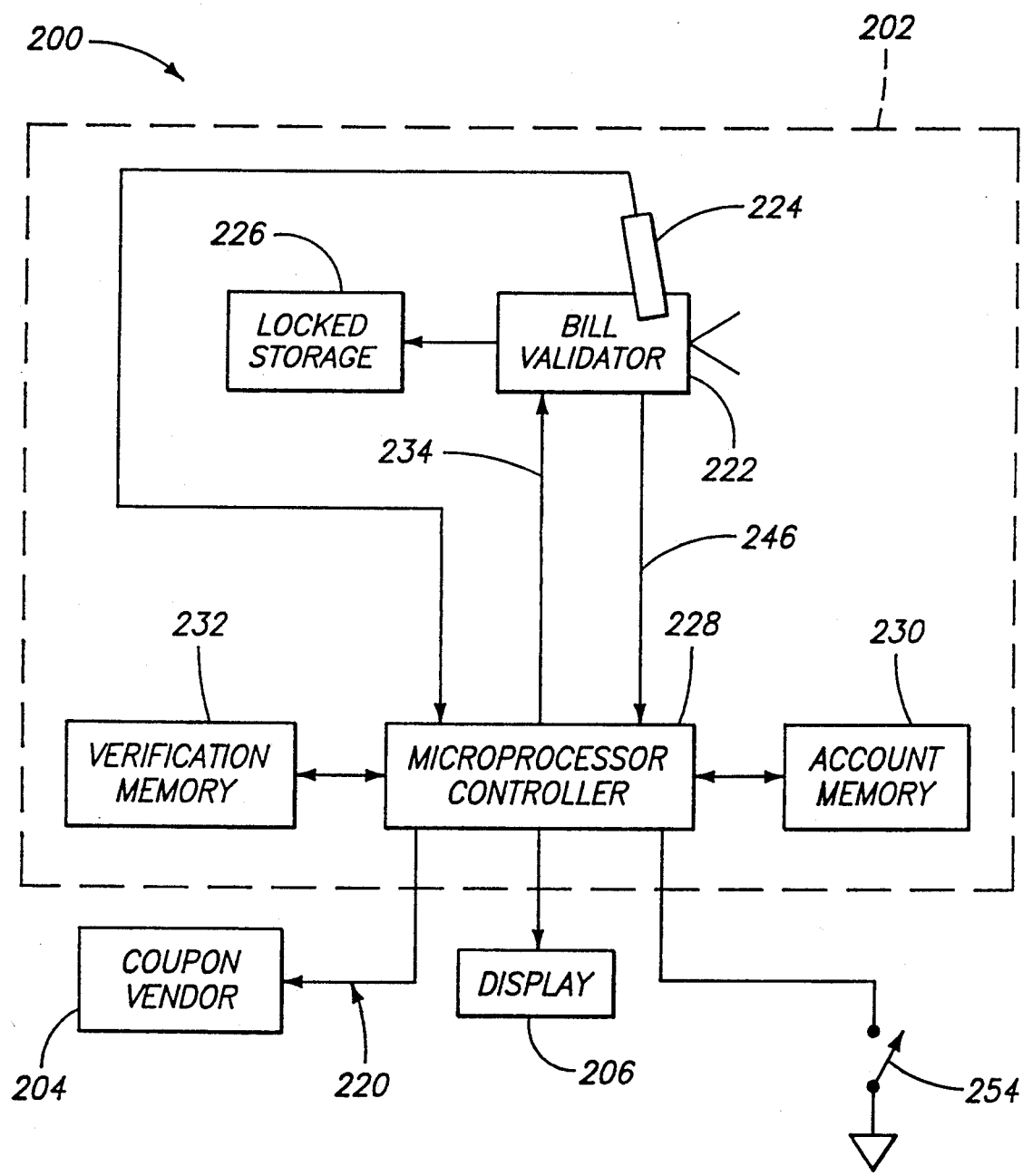
FIG. 7 is a block diagram of the pull-tab gaming machine of FIG. 6.

FIG. 7 shows gaming machine 200 in block diagram. Vendor 204 accepts a game credit electrical signal line 220 from coupon acceptor 202 and issues game credits in response thereto. Game credit signal line 220 preferably carries a series of electronic pulses representing the number of game credits to be issued. Coupon acceptor 202 accepts appropriate currency submitted by a player, as in a conventional pull-tab machine. It is operably connected to authorize or trigger coupon vendor 204 to selectively dispense individual game coupons to the player in response to the value of submitted currency. Once authorized, coupon vendor 204 dispenses coupons in response to a player depressing one of the selection dispensing buttons.

In addition to accepting currency, coupon acceptor 202 accepts winning game coupons as if they were currency, and automatically credits the player with the number of game credits represented by the submitted winning game coupons. Specifically, coupon acceptor 202 has means for accepting winning coupons themselves and for reading the prize codes encoded thereon. It is operably connected through line 220 to authorize coupon vendor 204 to issue game credits and to eventually dispense game coupons in response to the number of prize game credits coded on submitted winning game coupons, but only when said winning game coupons have identification codes which have not previously been read.

In the preferred embodiment, coupon acceptor 202 comprises a currency or bill validator 222, a code reader 224, a locked storage compartment 226, a microprocessor controller 228, an account memory 230, and a verification memory 232. Bill validator 222 and code reader 224 are housed within locked storage compartment 226.

Bill validator 222, code reader 224, and display unit 206 are connected through communications interfaces to microprocessor controller 228. Account memory 230 and verification memory 232 are conventional random access memories which are also connected to microprocessor controller 228. These memories are also preferably connected to a backup source of power, such as a battery, to prevent loss of data during power outages.

Microprocessor controller 228 includes means for triggering or authorizing coupon vendor 204 to dispense individual game coupons to a player in response to the value of submitted currency and in response to the number of prize game credits represented by the prize codes from submitted winning game coupons. More specifically, as noted above, it is connected to coupon vendor 204 through game credit signal line 220 to trigger vendor 204.

Microprocessor controller 228 is also programmed to coordinate the various functions of gaming machine 200, primarily accepting currency and winning game coupons and triggering coupon vendor 204 to issue the appropriate numbers of game credits. Microprocessor controller 228 is connected to display unit 206 to display accumulated game credits and various status messages.

To purchase game coupons, a player initially inserts currency into coupon acceptor 202 of gaming machine 200. The gaming machine records the value of such currency as game credits. The player depresses appropriate selection dispensing buttons 216, and coupon vendor 204 dispenses individual game coupons in response. To identify winning game coupons, the player separates the game coupons and inspects the player-readable prize codes printed on the back side of the playing portion. Winning coupons can be redeemed by a cashier for cash, as in conventional pull-tab games, or may be inserted back into coupon acceptor 202 for additional credits.

Coupon acceptor 202 includes coupon verification means for verifying that the coupon's game set code matches that of an earlier-submitted game set-up coupon and for determining whether the identification code of each submitted winning coupon has previously been read. The gaming machine will issue game credits only in response to game coupons having the appropriate game set code, as indicated by the game set-up coupon previously submitted by the machine operator. In addition, the coupon verification means records the unique coupon identification code of each winning coupon as it is received. After recording these numbers, any subsequent coupon from the same set having the same unique coupon identification code is rejected. This feature prevents a player from using duplicated game coupons.

The coupon verification means comprises the microprocessor controller 228 and the coupon verification memory 232. Coupon verification memory 232 has a single memory bit which corresponds or is mapped to each possible coupon identification code. Microprocessor controller 228 sets the single bit corresponding to a coupon identification code when that coupon identification code is read or decoded from a submitted game coupon. Subsequently, as further game coupons are submitted, microprocessor controller 228 accesses verification memory 232 to determine whether the winning coupon, or an identical coupon having the same identification code, has previously been submitted. If so, the coupon is rejected and an alarm optionally given. Submitting a new game set-up card clears verification memory 232.

Different verification memory schemes are of course possible. For instance, microprocessor 228 could be programmed to simply record a list of coupon identification codes as they are submitted. Such a list would require, however, a byte of memory storage for each possible coupon identification code. Instead, the mapping scheme described above requires only one byte for every eight possible coupon identification codes. Thus, the memory scheme of the present invention reduces memory requirements by a factor of eight over more conventional memory schemes. This allows compact and inexpensive single-chip microcontrollers to be used, which include computing logic, control interfaces, and memory on a single chip.

Microprocessor controller 228 is programmed to keep a running total of game activities in account memory 230 for accounting purposes. These totals can be displayed and identified on display 206 in a way which is similar to a slot machine. An accounting mode is activated by depressing or closing a switch 254 to ground. In response, microprocessor controller 228 serially displays a variety of numbers, including, for example: a total of all denominations of bills received by the machine; the number of game coupons received; the number of credits issued by coupon acceptor 202 to coupon vendor 204; and the number of game set-ups made. Account memory 230 is not affected by submission of a new game set-up coupon.

Figure 8:
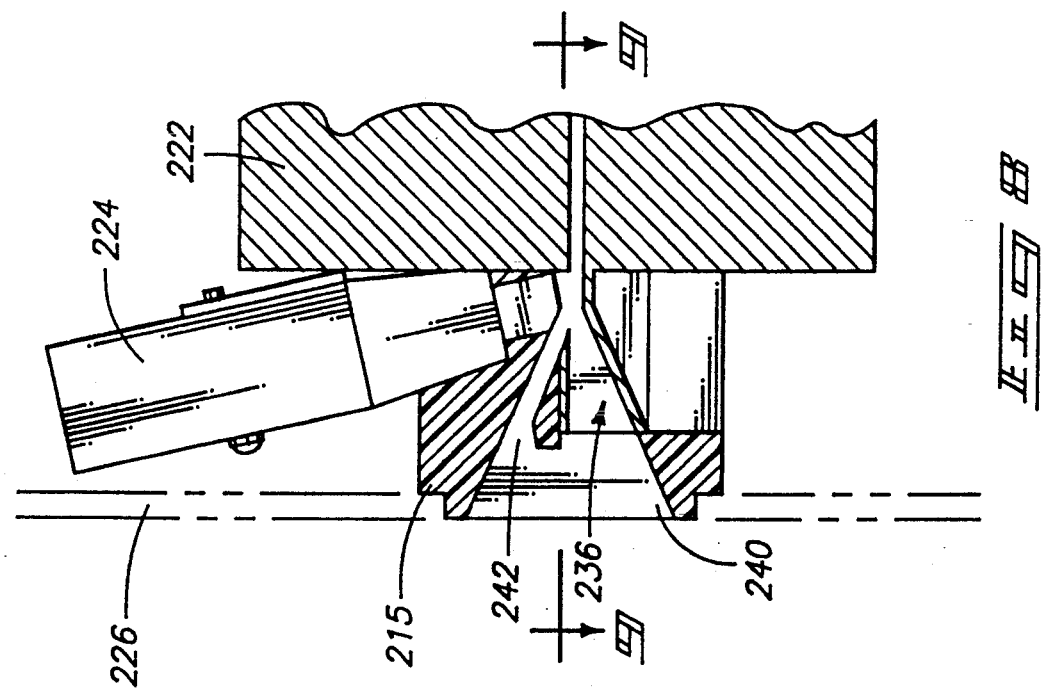
FIG. 8 is a vertical cross-sectional view showing a bill validator receiving throat and bezel in accordance with a preferred embodiment of the invention.

FIG. 8 shows the physical arrangement of bill validator 222 and code reader 224 in relationship to one another. Bill validator 222 is a paper currency reader such as used in a variety of vending machines. For example, the preferred embodiment described herein incorporates a modified Model IVO currency reader available from Coin Bill Validator, Inc. of Deer Park, N.Y. The unmodified Model IVO, as is the case with most paper currency readers, is programmed to automatically reject documents which cannot be confirmed as currency. In the preferred embodiment, however, the Model IVO has been modified to accept a reject override signal 234 (FIG. 7) from microprocessor controller 228. When the reject override signal 234 is active, bill validator 222 is programmed to override its normal response, and to accept the submitted document regardless of whether it can be confirmed as valid currency.

Bill validator 222 is mounted within locked storage compartment 226, having a receiving throat 236 which extends toward the front cover of locked storage compartment 226 to accept currency submitted by a player. A special receiving bezel 215 is provided in an aperture in the front cover of locked storage compartment 226 and surrounding receiving throat 236. Receiving bezel 215 facilitates entry of both currency and winning game coupons into locked storage compartment 226 and into bill validator 222.

Figure 10:
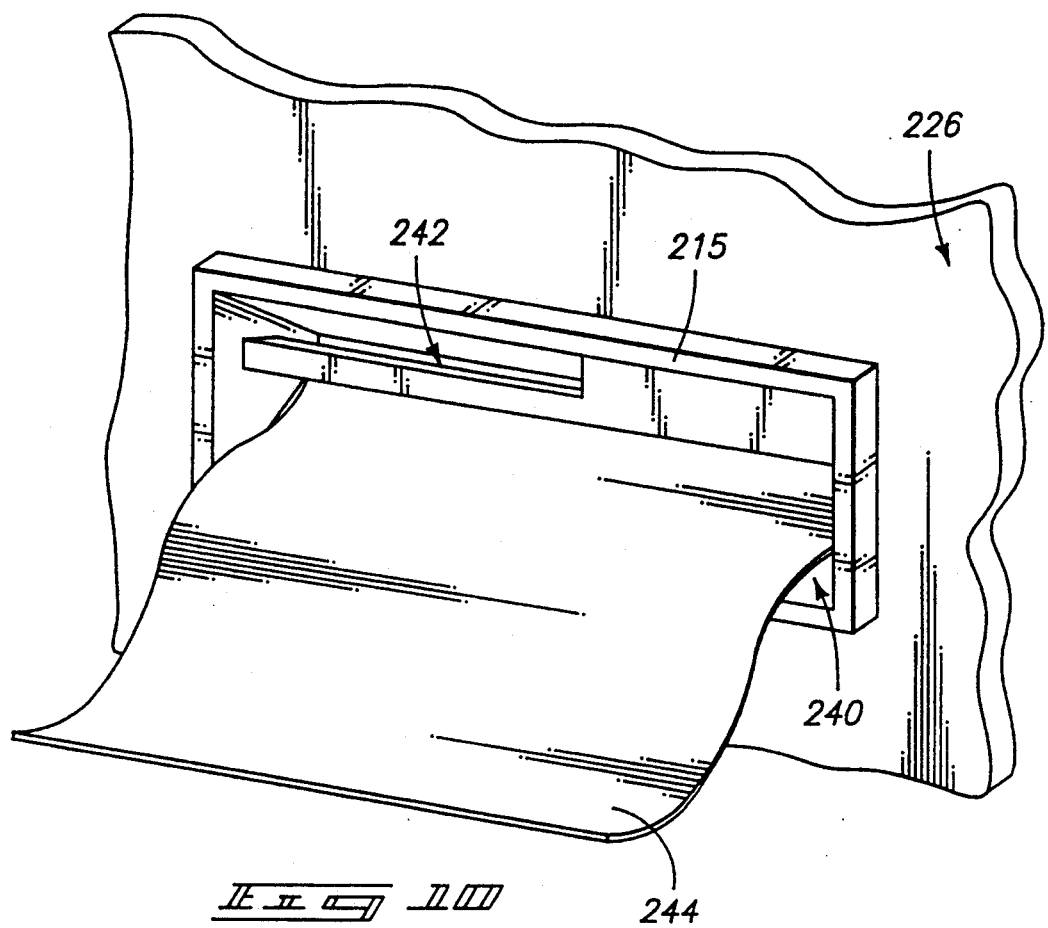
FIG. 10 is an enlarged perspective view of a receiving bezel in accordance with the invention, being shown while accepting submitted currency.

Bezel 215 is molded from a suitable plastic, having both a currency entry 240 and a game coupon entry 242. Currency entry 240 comprises a tapered opening extending the full width of receiving throat 236. Currency entry 240 accepts currency from a player and guides it into bill validator 222. Currency entry 240 is aligned so that currency is routed horizontally into receiving throat 236. FIG. 10 shows currency 244 being received through currency entry 240 into bill validator 222.

Bill validator 222 has appropriate conventional sensors and logic to detect legal currency. Normally, bill validator 222 will reject documents which cannot be verified to be valid currency. Rejected documents are returned out through throat 236 and currency entry 240 to the player. If valid currency is detected, however, bill validator 222 passes the currency through an internal passage into locked storage compartment 226. Upon detecting valid currency, bill validator 222 issues a series of electronic pulses through a validator credit line 246 to controller 228 (FIG. 7). Microprocessor controller 228 is operably connected to trigger coupon vendor 204 to dispense game coupons in response to these electronic pulses which indicate the amount or value of the submitted currency.

Figure 11:
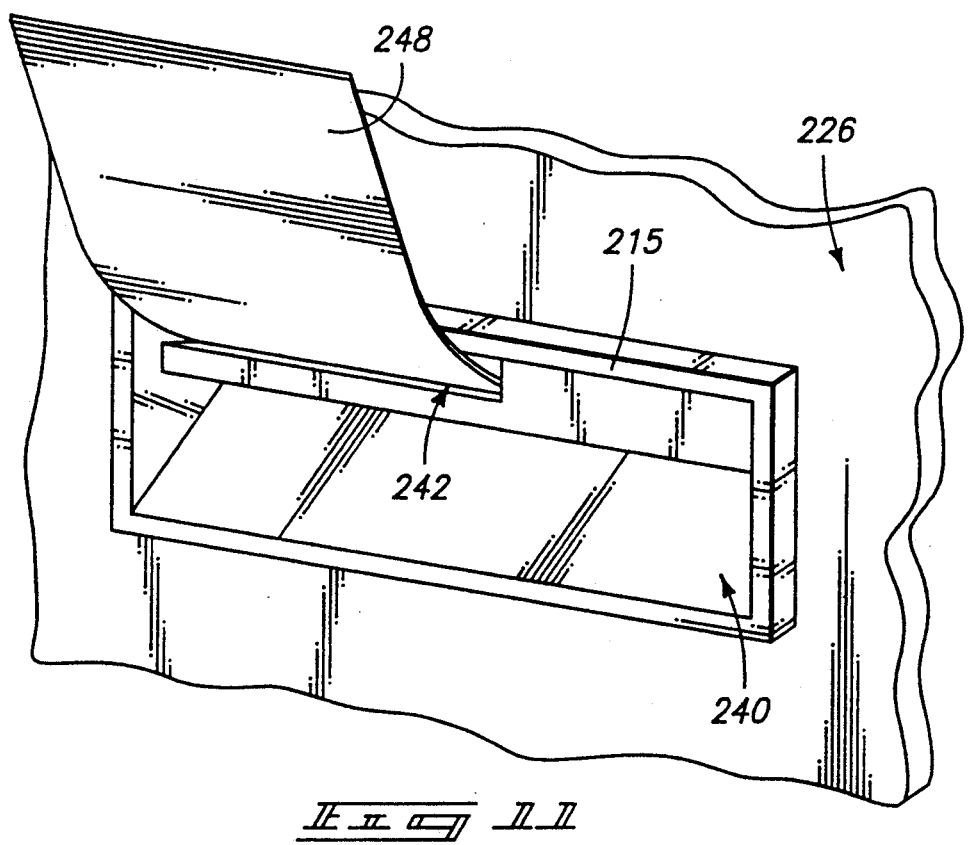
FIG. 11 is an enlarged perspective view as shown in FIG. 10, the receiving bezel being shown while accepting a submitted winning game coupon.

Bill validator 222 also accepts game coupons, through coupon entry 242. Coupon entry 242 has a width which corresponds to the width of a game coupon, generally less than the width of receiving throat 236. Coupon entry 242 accepts game coupons such as game coupon 248 shown in FIG. 11, and guides them into bill validator 222 beneath code reader 224. Coupon entry 242 is above currency entry 240, and is downwardly inclined to guide game coupons into the horizontally-extending receiving throat 236.

Figure 9:
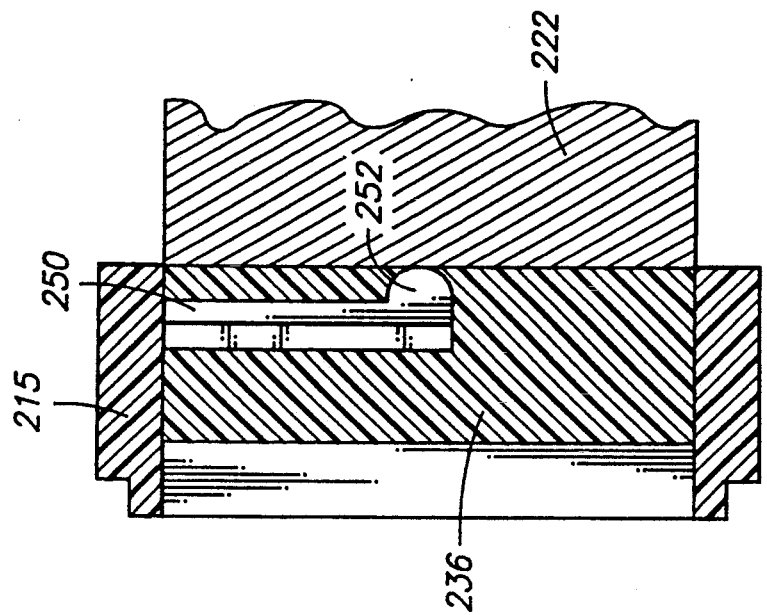
FIG. 9 is a horizontal cross-sectional view of the bill validator throat of FIG. 8, taken along the line 9—9 of FIG. 8.

Code reader 224 is mounted relative to bill validator 222 to scan the barcodes of winning game coupons as they are submitted to bill validator 222. More specifically, code reader 224 is received within bezel 215 above throat 236 and behind the front cover of locked storage compartment 226. Game coupons are inserted into coupon entry 242, which aligns them along the left-hand edge of throat 236. Slight modifications, as shown in FIG. 9, are required to allow game coupons to be inserted into receiving throat 236 and to allow code reader 224 to focus upon game coupons being drawn into bill validator 222 through receiving throat 236. Specifically, a slot 250 is formed across the top of receiving throat 236 to allow passage of game coupons from coupon entry 242. In addition, an aperture 252 is formed in the top of receiving throat 236 at a lateral position corresponding to the lateral position of the barcodes imprinted on inserted game coupons. This aperture allows code reader 224 to focus upon submitted game coupons.

Code reader 224 comprises a conventional scanning barcode reader which, in association with microprocessor controller 228, reads the number of prize game credits coded on submitted winning game coupons. For example, the preferred embodiment incorporates a standard Model LTS3 barcode reader, available from Welch Alyn of Skaneateles Falls, N.Y. Game coupons pass beneath code reader 224 as they are submitted, while code reader 224 and microprocessor controller 228 read and decode the barcode imprinted thereon. The barcode information is checked by microprocessor controller 228 for validity against the current game set code and against coupon identifications codes of game coupons already received and read. If a valid winning game coupon is detected, microprocessor controller 228 activates reject override signal 234, causing bill validator 222 to accept the game coupon and to pass it therethrough into locked storage department 226. Microprocessor controller 228 simultaneously issues the appropriate signals to coupon vendor 204 through credit signal line 220 to credit the player with the correct number of prize game credits.

If a non-winning game coupon is inserted, bill validator 222 rejects the submitted game coupon out through its receiving throat 236. However, because coupon entry 242 is inclined from above to meet receiving throat 236, the rejected game coupon will travel outward from bill validator 222 through currency entry 240 rather than through coupon entry 242.

The principal features of the preferred embodiment described above can be implemented in other types of gaming machines besides pull-tab machines. One possible application is with popular lottery games in which lottery tickets are presently purchased and subsequently redeemed from a cashier. With the invention described above, it is possible to both vend and redeem lottery tickets from an automated machine, providing convenience to both lottery players and merchants selling lottery tickets. It would also be desirable and possible in many such applications, with appropriate additions of logic and hardware, to allow a player to redeem winning coupons for cash rather than additional game coupons.

Another possible application is within a slot machine. The slot machine could be equipped with a coupon vendor so that a player could "cash out" at any time. Rather than dispensing cash, the slot machine would provide the player with a barcoded coupon representing the number of game credits the player has accumulated to that point. The coupon would then be redeemable at a cashier or at a coupon acceptor incorporated in the same or another slot machine.

Because of the coupon acceptor described above, a player is able to redeem game coupons at the gaming machine itself. Accordingly, there is no need to stop play while waiting for a cashier to redeem a winning coupon. Rather, the coupon can be immediately submitted to the gaming machine for game credits. This is a significant improvement in convenience for both players and owners of gaming establishments.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A gaming machine for vending game coupons in return for game credits, said game coupons being coded with a number of game credits and being redeemable for said number of game credits, the gaming machine comprising:
    a coupon vendor which selectively dispenses individual game coupons to a player; and
    a coupon acceptor which accepts said individual game coupons from the player after said individual game coupons have been dispensed by the coupon vendor, the coupon acceptor being operably connected to signal the gaming machine to issue game credits in response to the number of game credits coded on said individual game coupons.

2. The gaming machine of claim 1, the coupon acceptor comprising a currency acceptor which accepts currency from the player and establishes a value of the submitted currency, the coupon acceptor being operably connected to authorize the coupon vendor to dispense game coupons in response to the value of said currency.

3. The gaming machine of claim 1, wherein the coupon acceptor comprises a code reader for reading the number of game credits coded on submitted game coupons.

4. The gaming machine of claim 1, the coupon acceptor comprising:
    a currency validator which accepts currency submitted by the player and establishes a value of the submitted currency, the coupon acceptor being operably connected to authorize the coupon vendor to dispense game coupons in response to the value of said submitted currency; and
    the currency validator also accepting submitted game coupons, the currency validator including a code reader for reading the number of game credits coded on the submitted game coupons.

5. The gaming machine of claim 1, the coupon acceptor further comprising means for recording submitted game coupons and for rejecting duplications of game coupons which have already been submitted.

6. A gaming machine for vending game coupons in return for currency or game credits, wherein some of the vended game coupons are winning coupons, said winning coupons being coded with a digital machine-readable prize code representing a number of prize game credits and being redeemable for said number of prize game credits or for cash, the gaming machine comprising:
    a coupon vendor which selectively dispenses individual game coupons to a player;
    a coupon acceptor which accepts said individual game coupons from the player after said individual game coupons have been dispensed by the coupon vendor;
    the coupon acceptor including a code reader for reading the prize codes from winning coupons from among said individual game coupons;
    the coupon acceptor being operably connected to the coupon vendor to authorize the coupon vendor to dispense game coupons in response to the number of prize game credits represented by the prize codes from said winning game coupons.

7. The gaming machine of claim 6, the coupon acceptor including a currency validator which accepts currency from the player and establishes a value of the submitted currency, the coupon acceptor being operably connected to authorize the coupon vendor to dispense game coupons in response to the value of said currency.

8. The gaming machine of claim 6, wherein the machine-readable codes are barcodes imprinted on the winning game coupons, the code reader comprising a barcode reader.

9. The gaming machine of claim 6, the coupon acceptor comprising:
    a currency validator which receives currency submitted by the player and establishes a value of the submitted currency, the coupon acceptor being operably connected to authorize the coupon vendor to dispense game coupons in response to the value of said submitted currency; and
    the currency validator also receiving the submitted game coupons, the code reader being mounted on the currency validator to scan the prize codes a winning game coupons are received by the currency validator.

10. The gaming machine of claim 6, wherein the number of prize credits is coded on each winning game coupon with a barcode, the coupon acceptor comprising:
    a currency validator which receives game coupons and currency submitted by player and establishes a value of the submitted currency, the coupon acceptor being operably connected to authorize the coupon vendor to dispense game coupons in response to the value of said submitted currency;
    the code reader comprising a barcode reader;
    the currency validator also receiving the submitted game coupons, the barcode reader being mounted on the currency validator to scan the prize codes as winning game coupons are received by the currency validator.

11. The gaming machine of claim 6, wherein each winning game coupon is coded with a unique machine-readable coupon identification code, the coupon acceptor further comprising a coupon verification memory, wherein the coupon acceptor records coupon identification codes from submitted winning game coupons and rejects game coupons whose coupon identification codes have already been recorded.

12. The gaming machine of claim 6, wherein each winning game coupon is coded with a unique machine-readable coupon identification code;

the coupon acceptor further comprising a coupon verification memory having a single bit corresponding to each possible coupon identification code;

wherein the coupon acceptor sets the single bit corresponding to a coupon identification code when that coupon identification code is read from a submitted game coupon, and rejects a submitted game coupon when the bit corresponding to its coupon identification code has already been set.

13. A gaming machine for individually vending sets of game coupons in return for game credits, wherein some individual game coupons are winning coupons, said winning coupons being coded with a machine-readable prize code representing a number of prize game credits and a unique coupon identification code, the winning coupons being redeemable for said number of prize game credits or for currency, the gaming machine comprising:

a coupon vendor which selectively dispenses individual game coupons to a player;

a coupon acceptor which accepts individual game coupons submitted by the player;

the coupon acceptor including a code reader for reading the prize codes and the coupon identification codes from submitted winning game coupons;

the coupon acceptor also including coupon verification means for determining whether the identification code of each submitted winning coupon has previously been read; and the coupon acceptor being operably connected to the coupon vendor to authorize the coupon vendor to dispense game coupons in response to the number of prize game credits coded on submitted winning game coupons only when said winning game coupons have coupon identification codes which have not previously been read.

14. The gaming machine of claim 13, the coupon acceptor including a currency acceptor which accepts currency from the player and establishes a value of the submitted currency, the coupon acceptor being operably connected to authorize the coupon vendor to dispense game coupons in response to the value of said currency.

15. The gaming machine of claim 13, wherein the machine-readable codes are barcodes imprinted on the winning game coupons, the code reader comprising a barcode reader.

16. The gaming machine of claim 13, the coupon acceptor comprising:

a currency validator which receives currency submitted by the player and establishes a value of the submitted currency, the coupon acceptor being operably connected to authorize the coupon vendor to dispense game coupons in response to the value of said submitted currency; and the currency validator also receiving the submitted game coupons, the code reader being mounted on the currency validator to scan prize codes as winning game coupons are received by the currency validator.

17. The gaming machine of claim 13, wherein the prize codes are coded on each winning game coupon with a barcode, the coupon acceptor comprising:

a currency validator which receives game coupons and currency submitted by player and establishes a value of the submitted currency, the coupon acceptor being operably connected to authorize the coupon vendor to dispense game coupons in response to the value of said submitted currency;

the code reader comprising a barcode reader; and the currency validator also receiving the submitted game coupons, the barcode reader being mounted on the currency validator to scan prize codes as winning game coupons are received by the currency validator.

18. The gaming machine of claim 13, the coupon acceptor further comprising a coupon verification memory, wherein the coupon acceptor records coupon identification codes from submitted winning game coupons and rejects game coupons whose coupon identification codes have already been recorded.

19. The gaming machine of claim 13, the coupon acceptor further comprising a coupon verification memory having a single bit corresponding to each possible coupon identification code;

wherein the coupon acceptor sets the single bit corresponding to a coupon identification code when that coupon identification code is read from a submitted game coupon, and rejects a subsequently-submitted game coupon when the bit corresponding to its coupon identification code has already been set.

20. The gaming machine of claim 13, wherein each coupon of the set is coded with a common game set code, the coupon acceptor including coupon verification means for rejecting game coupons which are not coded with the common game set code.

21. A gaming machine coupon acceptor for authorizing a coupon vendor to dispense individual game coupons, wherein some of the vended game coupons are winning coupons, said winning coupons being coded with a digital machine-readable prize code representing a number of prize game credits and being redeemable for said number of prize game credits or for cash, the coupon acceptor comprising:

a currency validator which accepts currency and winning game coupons from a player after said winning game coupons have been dispensed by the coupon vendor;

a code reader positioned relative to the currency validator to scan prize codes from said winning coupons as they are accepted by the currency validator; and a controller operably connected to the currency validator and the code reader, the controller having means for authorizing the coupon vendor to dispense individual game coupons to a player in response to the value of submitted currency and in response to the number of prize game credits represented by the prize codes from said winning game coupons.

22. The gaming machine coupon acceptor of claim 21, wherein the machine-readable codes are barcodes imprinted on the winning game coupons, the code reader comprising a barcode reader.

23. The gaming machine coupon acceptor of claim 21, herein each winning game coupon is coded with a unique coupon identification code which is readable by the code reader, the coupon acceptor further comprising a coupon verification memory, wherein the controller is programmed to record coupon identification codes from submitted winning game coupons and to reject game coupons whose coupon identification codes have already been recorded.

24. The gaming machine coupon acceptor of claim 21, wherein each winning game coupon is coded with a unique machine-readable coupon identification code; the coupon acceptor further comprising a coupon verification memory having a single bit corresponding to each possible coupon identification code;

wherein the controller is programmed to set the single bit corresponding to a coupon identification code when that coupon identification code is read from a submitted game coupon, and to reject a submitted game coupon when the bit corresponding to its coupon identification code has already been set.

* * * * *